United States Patent
Sodi

(10) Patent No.: US 10,375,435 B2
(45) Date of Patent: Aug. 6, 2019

(54) METHOD FOR PROGRAMMING A RECORDING OF A PROGRAM BY MEANS OF A DIGITAL TELEVISION DECODER

(71) Applicant: SAGEMCOM BROADBAND SAS, Rueil Malmaison (FR)

(72) Inventor: Frédéric Sodi, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/779,239

(22) PCT Filed: Nov. 25, 2016

(86) PCT No.: PCT/EP2016/078807
§ 371 (c)(1),
(2) Date: May 25, 2018

(87) PCT Pub. No.: WO2017/089539
PCT Pub. Date: Jun. 1, 2017

(65) Prior Publication Data
US 2018/0352289 A1 Dec. 6, 2018

(30) Foreign Application Priority Data

Nov. 27, 2015 (FR) ...................... 15 61469

(51) Int. Cl.
*H04N 5/445* (2011.01)
*H04N 5/76* (2006.01)
(Continued)

(52) U.S. Cl.
CPC ..... *H04N 21/4334* (2013.01); *H04N 5/44543* (2013.01); *H04N 5/76* (2013.01);
(Continued)

(58) Field of Classification Search
CPC .......... H04N 21/4334; H04N 21/4345; H04N 21/47214; H04N 5/44543; H04N 5/76;
(Continued)

(56) References Cited

U.S. PATENT DOCUMENTS

| | | | |
|---|---|---|---|
| 8,427,588 B2 * | 4/2013 | Kimura | H04N 5/44 348/725 |
| 2004/0158874 A1 * | 8/2004 | Ono | H04N 5/44543 725/131 |
| 2008/0074556 A1 * | 3/2008 | Sakai | H04N 5/4401 348/726 |

FOREIGN PATENT DOCUMENTS

| | | |
|---|---|---|
| EP | 1 675 400 A1 | 6/2006 |
| WO | WO 01/95616 A2 | 12/2001 |

(Continued)

OTHER PUBLICATIONS

International Search Report as issued in International Patent Application No. PCT/EP2016/078807, dated Feb. 3, 2017.

*Primary Examiner* — Sherrie Hsia
(74) *Attorney, Agent, or Firm* — Pillsbury Winthrop Shaw Pittman LLP

(57) ABSTRACT

A method for programming a recording of a program by a digital television decoder. The decoder has a service plan including a plurality of services. The program to be recorded is broadcast on a first service. The decoder is aware of the first service, an identifier of the program to be recorded, and a theoretical start time of the program to be recorded. When the decoder receives a first standardized table from the first service, the decoder is put in a first operational mode in which the decoder starts recording the program based on the detection of an identifier of the program in the first standardized table, and, when the decoder detects no reception of the first standardized table, the decoder is put in a second
(Continued)

operational mode in which the decoder starts recording the program based on the theoretical start time of the program.

10 Claims, 2 Drawing Sheets

(51) Int. Cl.
    *H04N 21/433*     (2011.01)
    *H04N 21/472*     (2011.01)
    *H04N 21/434*     (2011.01)

(52) U.S. Cl.
    CPC ... *H04N 21/4345* (2013.01); *H04N 21/47214* (2013.01); *H04N 2005/44547* (2013.01); *H04N 2005/44556* (2013.01)

(58) Field of Classification Search
    CPC ........ H04N 5/44; H04N 5/4401; H04N 5/445; H04N 2005/44547; H04N 2005/44556
    USPC ........ 348/725, 726, 731; 725/131, 132, 134, 725/139, 140, 142, 151, 152
    See application file for complete search history.

(56) References Cited

FOREIGN PATENT DOCUMENTS

| | | |
|---|---|---|
| WO | WO 02/47380 A1 | 6/2002 |
| WO | WO 2004/057864 A2 | 7/2004 |

\* cited by examiner

METHOD FOR PROGRAMMING A RECORDING OF A PROGRAM BY MEANS OF A DIGITAL TELEVISION DECODER

CROSS-REFERENCE TO RELATED APPLICATIONS

This is the U.S. National Stage of PCT/EP2016/078807, filed Nov. 25, 2016, which in turn claims priority to French Application No. 1561469, filed Nov. 27, 2015, the entire contents of all applications are incorporated herein by reference in their entireties.

TECHNICAL FIELD OF THE INVENTION

The technical field of the invention is that of the programming of program recordings, and in particular that of the programming of television program recordings. The present invention relates to a method for programming a program recording by means of a digital television decoder.

TECHNOLOGICAL BACKGROUND OF THE INVENTION

A digital television decoder typically has a service plan comprising a plurality of services. A service is typically a television channel. Each service of the service plan is broadcast on a single frequency. Each frequency can broadcast one or more services. For each service, a programming of the television programs of said service may exist: this programming typically comprises the start time and the duration of each program broadcast on said service.

Two known methods exist for programming the recording of a program by means of a digital television decoder, respecting for example the DVB (Digital Video Broadcasting) consortium.

According to the first method, the digital television decoder is aware of at least:
  a first service of the service plan on which the program to be recorded is broadcast,
  a theoretical time of the program to be recorded, and
  a theoretical duration of the program to be recorded.

According to the first method, the digital television decoder starts the recording at the theoretical start time and stops the recording at the theoretical end time, the digital television decoder calculating the theoretical end time from the theoretical start time and the theoretical duration of the program to be recorded.

A drawback of the first method is that the digital television decoder cannot take account of potential drifts or modifications in the programming of the first service. Thus, if a user programs according to the first method the recording of a first program on the first service, and if this first program begins later and/or lasts longer than expected, the recording obtained will not be complete: the end of the first program will be missing.

According to the second method:
  the digital television decoder receives, for the first service and in a repeated manner, a standardized table comprising at any moment:
    a first data frame, related to a first program currently being broadcast on said service, and
    a second data frame, related to a second program to be broadcast on said service after the first program;
  the digital television decoder is aware of at least a first service of the service plan on which the program to be recorded is broadcast, a first frequency on which the first service is broadcast and an identifier of the program to be recorded.

Each program-related data frame comprises an identifier of said program. The digital television decoder starts the recording when:
  the digital television decoder detects the identifier of the program to be recorded in the first data frame, or
  the digital television decoder detects a first transition between the first data frame and the second data frame comprising the identifier of the program to be recorded.

The digital television decoder stops the recording when:
  the digital television decoder no longer detects the identifier of the program to be recorded in the first data frame, or
  the digital television decoder detects a second transition between the first data frame comprising the identifier of the program to be recorded and the second data frame.

The second method makes it possible to take into account potential drifts or modifications in the programming of the service on which the program to be recorded is broadcast. Indeed, according to the second method, the digital television decoder does not take into account static theoretical information which may have become inaccurate, but instead uses dynamically updated information which thus integrates all potential drifts or modifications arising in the programming.

The second method, more precise than the first method, has however the drawback of not being very robust. Indeed, in the event of non-reception of the standardized table of the service on which the program to be recorded is broadcast, the digital television decoder finds itself completely incapable of starting the recording of the program, and the recording does not take place at all.

SUMMARY OF THE INVENTION

The invention offers a solution to the aforementioned problems, by proposing a method for programming a recording of a program by means of a digital television decoder, the method being both precise and robust.

A first aspect of the invention thus relates to a method for programming a recording of a program by means of a digital television decoder, the digital television decoder having a service plan comprising a plurality of services, the program to be recorded being broadcast on a first service from said plurality, the digital television decoder being aware of the first service, an identifier of the program to be recorded and a theoretical start time of the program to be recorded, the method comprising the following steps:
  if the digital television decoder receives a first standardized table from the first service, the first standardized table comprising at any moment a first data frame related to a first program currently being broadcast on the first service and a second data frame related to a second program broadcast on the first service immediately after the first program, each program-related data frame comprising an identifier of said program, the digital television decoder is put in a first operational mode in which it starts recording the program to be recorded on the basis of the detection of the identifier of said program in the first standardized table;
  if the digital television decoder detects no reception of the first standardized table, the digital television decoder is put in a second operational mode according to which it starts recording the program on the basis of the theoretical start time of the program;

the first standardized table being broadcast by a first frequency, the digital television decoder calculates a connection cut-off time at the first frequency on the basis of the theoretical start time of the program to be recorded and a safety time interval, the connection cut-off time at the first frequency being previous to or equal to the theoretical start time of the program to be recorded;

if the digital television decoder is put in the second operational mode before the connection cut-off time, the digital television decoder connects to the first frequency at the latest at said connection cut-off time;

if the digital television decoder is put in the second operational mode at the connection cut-off time or after the connection cut-off time, the digital television decoder connects to the first frequency as soon as it is put in the second operational mode.

"A second program broadcast immediately after the first program" is taken to mean the fact that there is no third party program broadcast between the first and second programs. An interval may be provided between the first and second programs, during which no broadcast takes place or during which a short program such as one or more adverts, or one or more trailers, is broadcast. Alternatively, the broadcasting of the second program can begin from the moment that the broadcasting of the first program has finished.

The method according to one aspect of the invention advantageously uses a digital television decoder having first and second operational modes. The digital television decoder switches dynamically from the first operational mode to the second operational mode or from the second operational mode to the first operational mode, as a function of it receiving, or it not receiving, a first standardized table. The safety time interval is advantageously chosen in such a way that the digital television decoder has at its disposal, once connected to the first frequency, sufficient time before the theoretical start time of the program to be recorded to receive the first standardized table and to process the information contained in the first standardized table. In the event of actual reception of the first standardized table, the digital television decoder can then advantageously place itself in the first operational mode. The method according to one aspect of the invention thereby guarantees that the programmed recording has indeed started, that a recording is thus systematically obtained at the end of the method and that it is the best recording possible given notably the frequencies to which the digital television decoder is connected at any moment.

Apart from the characteristics that have just been described in the preceding paragraph, the method for programming a recording of a program by means of a digital television decoder according to one aspect of the invention can have one or more additional characteristics among the following, considered individually or according to all technically possible combinations thereof:

The digital television decoder is initially in the first operational mode. Advantageously the first operational mode of the digital television decoder is thereby favoured, which takes account of potential modifications in the programming of the first service on which the program to be recorded is broadcast in order to offer a precise and complete recording.

For each service having a standardized table, the standardized table of said service is broadcast at least by one frequency; the digital television decoder is aware of, for each service of the service plan, a set of other frequencies broadcasting the standardized table specific to said service; if the digital television decoder is not connected to any frequency broadcasting the first standardized table, the digital television decoder is automatically put in the second operational mode.

In the first operational mode, the digital television decoder starts the recording of the program when it detects that the identifier of the program to be recorded is present in the first data frame.

Alternatively, in the first operational mode, the digital television decoder starts the recording of the program to be recorded when, having detected beforehand that the identifier of the program to be recorded is present in the second data frame, it detects a first transition between the first data frame and the second data frame comprising the identifier of the program to be recorded. In this way, the start of the recording of the program is advantageously anticipated.

The digital television decoder detects no reception of the first standardized table if a first time limit goes by without the digital television decoder receiving the first standardized table. The first time limit is preferentially greater than or equal to the duration D which separates two successive receptions of the first standardized table. The first time limit may be zero. The reception of the first standardized table by the television decoder may be periodical: in this case, two successive receptions of the first standardized table are always separated by the same duration D, which is a period. Alternatively, the reception of the first standardized table by the television decoder may not be periodical: in this case, the duration D separating two successive receptions of the first standardized table is variable.

The digital television decoder is aware of a theoretical duration of the program to be recorded; the digital television decoder calculates a theoretical end time of the program to be recorded from the theoretical start time and the theoretical duration of the program to be recorded; in the first operational mode, the digital television decoder stops the recording of the program to be recorded on the basis of the detection of no identifier of said program in the standardized table; in the second operational mode, the digital television decoder stops the recording of the program to be recorded on the basis of the theoretical end time of the program to be recorded.

In the first operational mode, the digital television decoder stops the recording of the program when it detects that the identifier of the program to be recorded disappears from the first data frame.

A second aspect of the invention relates to a digital television decoder for recording a program, the digital television decoder having a service plan comprising a plurality of services, the program to be recorded being broadcast on a first service from said plurality, the digital television decoder being aware of the first service, an identifier of the program to be recorded and a theoretical start time of the program to be recorded, the digital television decoder comprising elements for implementing the steps of the method for programming according to the first aspect of the invention.

The digital television decoder is a hardware component which comprises at least an interface, a processor or microprocessor and a physical non-transitory memory comprising instruction codes for the implementation of the steps of the method for programming according to the first aspect of the invention. When an action is ascribed to the digital television decoder, said action is in fact carried out by a processor or microprocessor of the digital television decoder, commanded by instruction codes recorded in a non-transitory physical memory of the digital television decoder. When the digital television decoder transmits or receives a message, said message is transmitted or received via a communication interface of said digital television decoder.

A third aspect of the invention relates to a computer program product including instructions which, when the program is executed by a computer, lead it to implement the steps of the method for programming according to the first aspect of the invention. In particular, those skilled in the art will recognise that a digital television decoder is an example of computer. The third aspect of the invention thus relates in particular to a computer program product including instructions which, when the program is executed by means of a digital television decoder, lead it to implement the steps of the method for programming according to the first aspect of the invention.

The computer program including instructions that can be executed by a machine for implementing the method according to one aspect of the invention may be implemented by a computer including at least an interface, a processor and a non-transitory physical memory, also designated in a general manner as being a non-transitory support that can be read by a computer or a non-transitory storage memory. The computer is a computer for particular use, given that it is programmed to execute the specific steps of the method described in the present document. The non-transitory memory is encoded or programmed with specific code instructions for implementing the method described in the present document and the steps that are associated with it. The non-transitory memory communicates with the physical processor such that the physical processor, when it is used, reads and executes the specific code instructions that are integrated in the non-transitory memory. The interface of the computer for particular use communicates with the physical processor and receives input parameters which are processed by the physical processor.

A fourth aspect of the invention relates to a recording support that can be read by a computer, on which is recorded the computer program product according to the third aspect of the invention. The fourth aspect of the invention relates in particular to a recording support that can be read by means of a digital television decoder, on which is recorded the computer program product according to the third aspect of the invention. The recording support such as that used in the invention is non-transitory and refers to any support contributing to supplying instructions to a processor for the execution of said instructions. Such a support may take numerous forms, including, in a non-limiting manner: non-volatile supports, volatile supports and transmission supports. Non-volatile supports include, for example, optical or magnetic disks. Volatile supports include, for example, dynamic memories. Transmission supports include, for example, coaxial cables, copper wires and optic fibres. Current forms of supports that can be read by computer include, for example, a minidisk, a floppy disk, a hard disk, a magnetic tape or any other magnetic support, a CD-ROM, a DVD or any other optical support, punch cards, papier strips or any other physical support with hole patterns, a RAM, a PROM, an EPROM, a FLASH-EPROM memory or any other chip or memory cartridge, a carrier wave, and any other support from which a computer is able to read.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION OF AT LEAST ONE EMBODIMENT OF THE INVENTION

Unless stated otherwise, a same element appearing in the different figures has a single reference.

Figure 1:
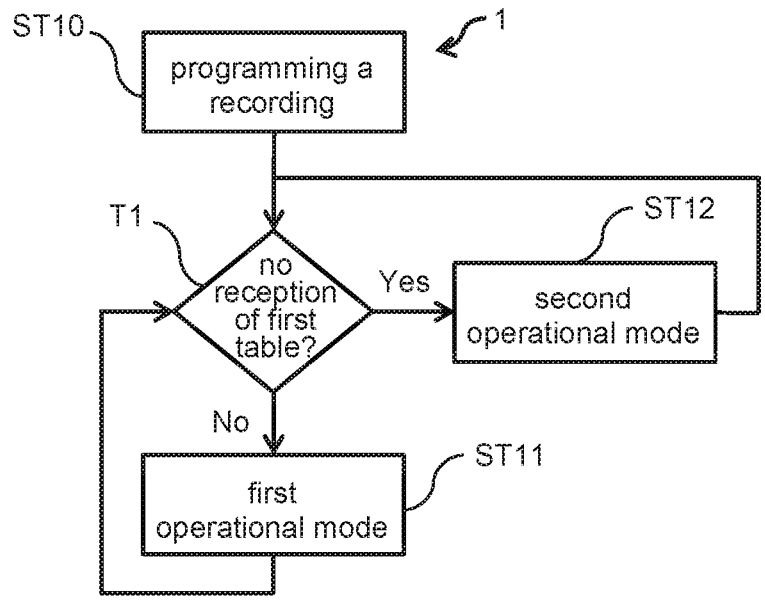
FIG. 1 shows a diagram of the steps of a method for programming a recording of a program by means of a digital television decoder according to a first embodiment of the invention.

FIG. 1 shows a diagram of the steps of a method 1 for programming a recording of a program by means of a digital television decoder according to a first embodiment of the invention.

The digital television decoder typically has a service plan comprising a plurality of services, the program to be recorded being broadcast on a first service from said plurality. In the present description the terms "service" and "television channel" are employed indiscriminately. The first service is broadcast on a first frequency. The first frequency can uniquely broadcast the first service or, alternatively, broadcast one or more other services in addition to the first service.

Each service of the plurality of services may have a standardized table that is specific to it, or instead not have a standardized table. A standardized table specific to a service comprises at any moment a first data frame related to a first program currently being broadcast on said service and a second data frame related to a second program broadcast on said service immediately after the first program, each program-related data frame comprising an identifier of said program.

In a particular example, the first service has a first standardized table that is specific to it. In this case, the first standardized table is broadcast at least on the first frequency. The first standardized table may also be broadcast on one or more other frequencies. The first frequency, which broadcasts the first standardized table, can also broadcast one or more other standardized tables, each other standardized table being specific to a service of the service plan. A standardized table is for example an EIT (Event Information Table) according to the DVB consortium.

The digital television decoder typically receives a flux of signals from a television operator. The flux of signals comprises the standardized tables of the services of the service plan that have a standardized table.

The method 1 according to the first embodiment of the invention initially comprises a step st10, at the end of which the digital television decoder is aware of:
a first service of the service plan on which the program to be recorded is broadcast, an identifier of the program to be recorded,
a theoretical start time of the program to be recorded, and
a theoretical duration of the program to be recorded.

The user can supply to the digital television decoder, through a human-machine interface, information of an identifier of the program to be recorded. Being aware of the identifier of the program to be recorded, the digital television decoder can then recover the broadcast service information of the program to be recorded, the frequency or frequencies of broadcasting the service, the theoretical start time and theoretical duration of the program in a flux of signals transmitted by a digital television operator destined for the digital television decoder. Alternatively, the digital television decoder can receive, in the flux of signals transmitted by the digital television operator, information concerning a plurality of television programs; this information typically comprises, for each television program, an identifier of said program, a theoretical start time and a theoretical duration of said program. The digital television decoder can then display for the user a list of the plurality of television programs of which the digital television decoder has received information. The user can then select a program to be recorded among the plurality of programs, from the television decoder. "The digital television decoder is aware of information" or "the digital television decoder has taken cognizance of information" is taken to mean the fact that the digital television decoder has recorded or records said information in a memory.

The digital television decoder typically calculates a theoretical end time of the program to be recorded from the theoretical start time and the theoretical duration of the program to be recorded. The theoretical start time of the program to be recorded may advantageously be modified during an updating or refreshment, for example as a function of information received by the digital reception decoder in the flux of signals transmitted by the digital television operator. If the theoretical start time of the program to be recorded is modified, the digital television decoder advantageously recalculates the theoretical end time from the modified start time and the theoretical duration of the program to be recorded.

The method 1 according to the first embodiment of the invention next comprises a step T1 according to which the digital television decoder tests if it detects no reception of the first standardized table specific to the first service. The step T1 may thus be associated with the question: "does the digital television decoder detect no reception of the first standardized table?"

If the digital television decoder does not detect no reception of the first standardized table, that is to say if the response to the question of step T1 is "no", the method 1 according to the first embodiment of the invention next comprises a step st11 according to which the digital television decoder is put in a first operational mode. The method 1 according to the first embodiment of the invention next comprises once again the test step T1.

If the digital television decoder detects on the other hand no reception of the first standardized table, that is to say if the response to the question of step T1 is "yes", the method 1 according to the first embodiment of the invention next comprises a step st12 according to which the digital television decoder is put in a second operational mode. The method 1 according to the first embodiment of the invention next comprises once again the test step T1.

The digital television decoder detects no reception of the first standardized table if a first time limit passes by without the digital television decoder receiving the first standardized table. The first time limit is preferentially greater than or equal to the duration D that separates two successive receptions of the first standardized table. The duration D typically depends on the communication standard used. In a particular exemplary embodiment, the ETSI telecommunication standard is used. The duration D is then preferentially a duration greater than or equal to 25 ms, and less than or equal to 2 seconds.

In the first operational mode:
the digital television decoder starts the recording of the program to be recorded on the basis of the detection of the identifier of said program in the first standardized table;
the recording of the program having been started beforehand, the digital television decoder stops the recording of the program to be recorded on the basis of the detection of no identifier of said program in the first standardized table.

In the first operational mode, the digital television decoder can start the recording of the program to be recorded when it detects that the identifier of the program to be recorded is present in the first data frame of the first standardized table. Alternatively, the digital television decoder can start the recording of the program to be recorded when, having detected beforehand that the identifier of the program to be recorded is present in the second data frame, the digital television decoder detects a first transition between the first data frame and the second data frame comprising the identifier of the program to be recorded. This alternative advantageously makes it possible to anticipate the start of the recording of the program to be recorded, in order to reduce the risk that the start of the program to be recorded is not recorded in practice.

In the first operational mode, the digital television decoder can stop the recording of the program to be recorded when it detects that the identifier of the program to be recorded disappears from the first data frame. Alternatively, the digital television decoder can stop the recording of the program to be recorded when, having detected beforehand that the identifier of the program to be recorded is present in the first data frame, the digital television decoder detects a second transition between the first data frame comprising the identifier of the program to be recorded and the second data frame.

In the second operational mode:
the digital television decoder starts the recording of the program to be recorded on the basis of the theoretical start time of the program to be recorded or, if need be, on the basis of the modified start time of the program to be recorded;
the recording of the program having been started beforehand, the digital television decoder stops the recording of the program to be recorded on the basis of the theoretical end time of the program to be recorded.

Figure 2:
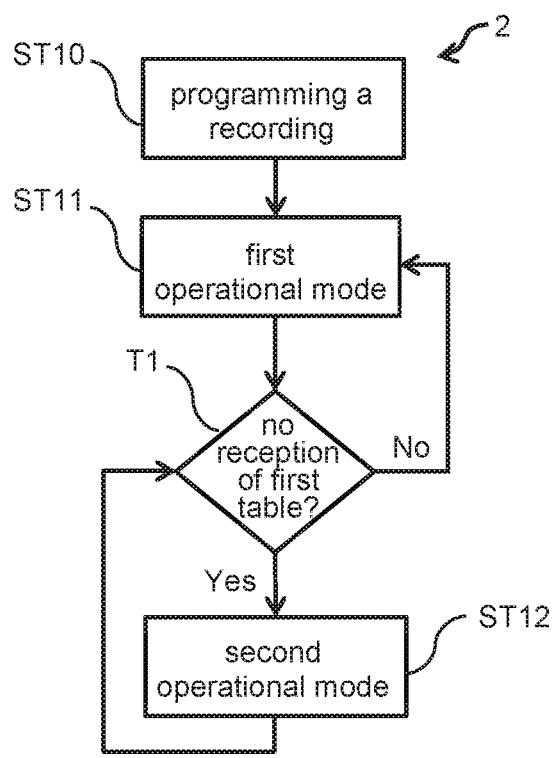
FIG. 2 shows a diagram of the steps of a method for programming a recording of a program by means of a digital television decoder according to a second embodiment of the invention.

FIG. 2 shows a diagram of the steps of a method 2 for programming a recording of a program by means of a digital television decoder according to a second embodiment of the invention. The method 2 according to the second embodiment of the invention initially comprises the step st10, described previously, at the end of which the digital television decoder is aware of:
the first service of the service plan on which the program to be recorded is broadcast,
the identifier of the program to be recorded, the theoretical start time of the program to be recorded, and the theoretical duration of the program to be recorded.

The method 2 according to the second embodiment of the invention next comprises the step st11, described previously, according to which the digital television decoder is put in the first operational mode, then the step T1, described previously, according to which the digital television decoder tests if it detects no reception of the first standardized table.

If the response to the question: "does the digital television decoder detect no reception of the first standardized table?" of test step T1 is "no", the method 2 according to the second embodiment of the invention once again comprises the step st11 according to which the digital television decoder is put in the first operational mode.

If the response to the question: "does the digital television decoder detect no reception of the first standardized table?" of test step T1 is "yes", the method 2 according to the second embodiment of the invention next comprises the step st12 according to which the digital television decoder is put in the second operational mode.

According to the second embodiment of the invention, the digital television decoder is initially in the first operational mode. The second embodiment of the invention thus advantageously favours, by default, the first operational mode.

Figure 3:
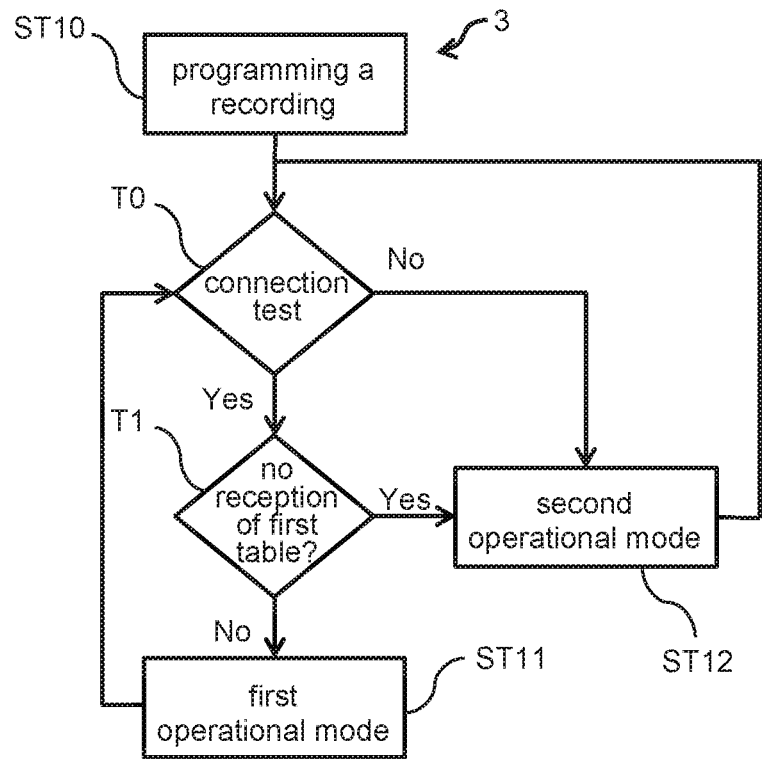
FIG. 3 shows a diagram of the steps of a method for programming a recording of a program by means of a digital television decoder according to a third embodiment of the invention.

FIG. 3 shows a diagram of the steps of a method 3 for programming a recording of a program by means of a digital television decoder according to a third embodiment of the invention.

The method 3 according to the third embodiment of the invention initially comprises a test step TO according to which the digital television decoder tests if it is connected to at least one frequency broadcasting the first standardized table. The step TO may thus be associated with the question: "is the digital television decoder connected to at least one frequency broadcasting the first standardized table?"

If the decoder is not connected to any frequency broadcasting the first standardized table, that is to say if the response to the question of test step TO is "no", the method 3 according to the alternative of the first embodiment next comprises the step st12 according to which the digital television decoder is put in the second operational mode, then once again the test step TO.

If the decoder is connected to at least one frequency broadcasting the first standardized table, that is to say if the response to the question of test step TO is "yes", the method 3 according to the third embodiment next comprises the test step T1, described previously, according to which the digital television decoder tests if it detects no reception of the first standardized table.

If the digital television decoder detects no reception of the first standardized table, that is to say if the response to the question of test step T1 is "yes", the method 3 according to the third embodiment next comprises the step st12 according to which the digital television decoder is put in the second operational mode, then once again the test step TO, described previously.

If the digital television decoder does not detect no reception of the first standardized table, that is to say if the response to the question of test step T1 is "no", the method 3 according to the third embodiment of the invention next comprises the step st11 according to which the digital television decoder is put in the first operational mode, then once again the test step TO, described previously.

Figure 4:
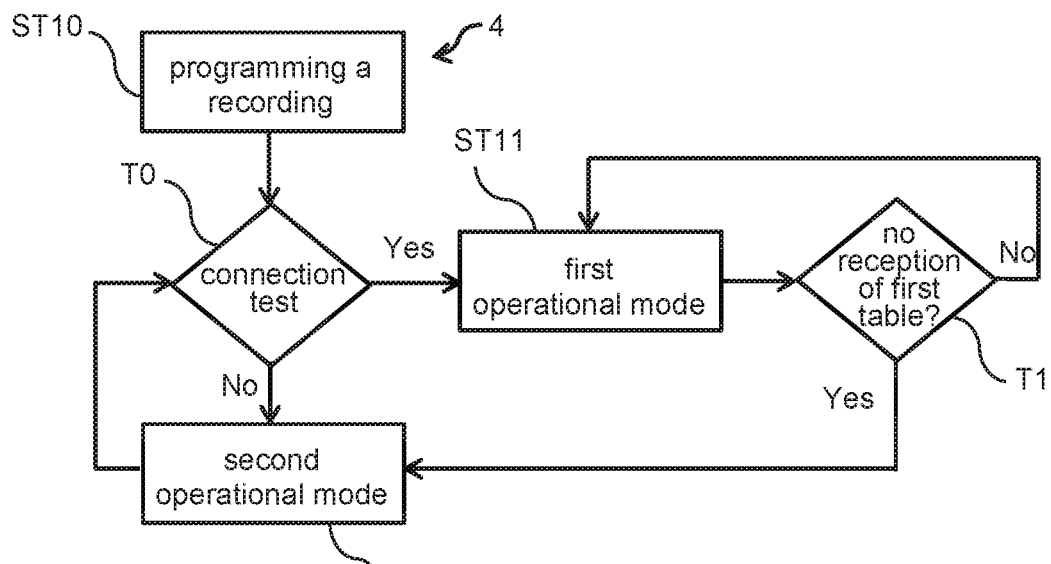
FIG. 4 shows a diagram of the steps of a method for programming a recording of a program by means of a digital television decoder according to a fourth embodiment of the invention.

FIG. 4 shows a diagram of the steps of a method 4 for programming a recording of a program by means of a digital television decoder according to a fourth embodiment of the invention.

The method 4 according to the fourth embodiment of the invention initially comprises the test step TO, described previously, according to which the digital television decoder tests if it is connected to at least one frequency broadcasting the first standardized table.

If the response to the question "is the digital television decoder connected to at least one frequency broadcasting the first standardized table?" of test step TO is "no", the method 4 according to the fourth embodiment next comprises the step st12 according to which the digital television decoder is put in the second operational mode, then once again the test step TO, described previously.

If the response to the question "is the digital television decoder connected to at least one frequency broadcasting the first standardized table?" of test step TO is "yes", the method 4 according to the fourth embodiment of the invention next comprises the step st11 according to which the digital television decoder is put in the first operational mode, then the test step T1, described previously, according to which the digital television decoder tests if it detects no reception of the first standardized table.

If the digital television decoder detects no reception of the first standardized table, that is to say if the response to the test step T1 is "yes", the method 4 according to the fourth embodiment of the invention next comprises the step st12 according to which the digital television decoder is put in the second operational mode, then the test step TO, described previously.

If the digital television decoder fails to detect no reception of the first standardized table, that is to say if the response to the test step T1 is "no", the method 4 according to the fourth embodiment of the invention once again comprises the step st11 according to which the digital television decoder is put in the first operational mode, then once again the test step T1, described previously.

It is generally possible to distinguish two cases in which the digital television decoder correctly receives the first standardized table from the first service.

In the first case, the digital television decoder is connected to the first frequency and there is no dysfunction at the transmission of the first frequency by the television operator or at the reception of the first frequency by the digital television decoder. Indeed, the first standardized table is at least broadcast on the first frequency.

In the second case, the digital television decoder is connected to a second frequency, distinct from the first frequency, on which the first standardized table is broadcast thanks to a cross-diffusion technique, and there is no dysfunction at the transmission of the second frequency by the television operator or at the reception of the second frequency by the digital television decoder.

The first and second cases are not mutually exclusive, that is to say that the digital television decoder may be simultaneously connected to the first frequency and to the second frequency. The digital television decoder may typically be simultaneously connected to two or four different frequencies. Digital television decoders also exist which can be simultaneously connected to sixteen different frequencies.

In the method 3 according to the third embodiment of the invention or in the method 4 according to the fourth embodiment of the invention, the digital television decoder advantageously is aware of, for each service of the service plan having a standardized table broadcast on a given frequency, a set of other frequencies that broadcast the standardized table specific to said service. If said standardized table is only broadcast on the given frequency, the set of other frequencies is empty. If the digital television decoder is not connected to any frequency broadcasting the first standardized table, the digital television decoder is advantageously put automatically in the second operational mode: this behaviour is notably illustrated by the test step TO, which has been described in relation with FIGS. 3 and 4.

Generally speaking, when the digital television decoder is programmed by a method according to any of the embodiments of the invention to record a program on the first frequency of the service plan, the digital television decoder connects, at a given moment, to the first frequency to be able to actually realise the programmed recording. In this context, the digital television decoder advantageously calculates a connection cut-off time at the first frequency on the basis of the theoretical start time of the program to be recorded and a safety time interval. The connection cut-off time at the first frequency is advantageously prior to the theoretical start time of the program to be recorded. The connection cut-off time at the first frequency may alternatively be equal to the theoretical start time of the program to be recorded: in this case, the safety time interval is zero. The digital television decoder advantageously uses the connection cut-off time at the first frequency in its second operational mode:

- if the digital television decoder is put in the second operational mode before the connection cut-off time, the digital television decoder connects to the first frequency at the latest at said connection cut-off time. The digital television decoder can absolutely be connected to the first frequency before the connection cut-off time and/or before being put in the second operational mode.
- If the digital television decoder is put in the second operational mode at the connection cut-off time or after the connection cut-off time, the digital television decoder connects to the first frequency as soon as it is put in the second operational mode.

The safety time interval is advantageously chosen in such a way that, when the digital television decoder connects to the first frequency at the connection cut-off time, the digital television decoder has available sufficient time to receive the first standardized table and to process the data contained in the first standardized table. Thus, in the case where the digital television decoder is initially in the second operational mode because it is not connected to any frequency broadcasting the first standardized table, the digital television decoder advantageously has the time to switch to the first operational mode, thanks to its connection to the first frequency at the latest at the connection cut-off time. Despite the sufficient time that it has available, the digital television decoder can absolutely not switch to the first operational mode, for example if it does not receive the first standardized table due to a dysfunction.

Alternatively, the first service may not have a standardized table. In this case, the digital television decoder detects the fact of no reception of the first standardized table and the digital television decoder is put in the second operational mode.

The invention claimed is:

1. A method for programming a recording of a program by means of a digital television decoder, the digital television decoder having a service plan comprising a plurality of services, the program to be recorded being broadcast on a first service from said plurality of services, the digital television decoder being aware of the first service, an identifier of the program to be recorded and a theoretical start time of the program to be recorded, the method comprising the following steps:
   when the digital television decoder receives a first standardized table from the first service, the first standardized table comprising at any moment a first data frame related to a first program currently being broadcast on the first service and a second data frame related to a second program broadcast on the first service immediately after the first program, each program-related data frame comprising an identifier of said program, putting the digital television decoder in a first operational mode in which said decoder starts recording the program to be recorded on the basis of the detection of the identifier of said program in the first standardized table;
   when the digital television decoder detects no reception of the first standardized table, putting the digital television decoder in a second operational mode according to which said decoder starts recording the program on the basis of the theoretical start time of the program;
   the first standardized table being broadcast by a first frequency, calculating by the digital television decoder a connection cut-off time at the first frequency on the basis of the theoretical start time of the program to be recorded and a safety time interval, the connection cut-off time at the first frequency being prior to or equal to the theoretical start time of the program to be recorded;
   when the digital television decoder is put in the second operational mode before the connection cut-off time, connecting the digital television decoder to the first frequency at the latest at said connection cut-off time; and
   when the digital television decoder is put in the second operational mode at the connection cut-off time or after the connection cut-off time, connecting the digital television decoder to the first frequency as soon as it is put in the second operational mode.

2. The method for programming according to claim 1, wherein:
   for each service having a standardized table, the standardized table of said service is broadcast at least by one frequency;
   the digital television decoder is aware of, for each service of the service plan, a set of other frequencies broadcasting the standardized table specific to said service;
   when the digital television decoder is not connected to any frequency broadcasting the first standardized table, the digital television decoder is put automatically in the second operational mode.

3. The method for programming according to claim 1, wherein, in the first operational mode, the digital television decoder starts the recording of the program when the digital television decoder detects that the identifier of the program to be recorded is present in the first data frame.

4. The method for programming according to claim 1, wherein, in the first operational mode, the digital television decoder starts the recording of the program to be recorded when, having detected beforehand that the identifier of the program to be recorded is present in the second data frame, the digital television decoder detects a first transition between the first data frame and the second data frame comprising the identifier of the program to be recorded.

5. The method for programming according to claim 1, wherein the digital television decoder detects no reception of the first standardized table when a first time limit goes by without the digital television decoder receiving the first standardized table.

6. The method for programming according to claim 1, wherein:
   the digital television decoder is aware of a theoretical duration of the program to be recorded;
   the digital television decoder calculates a theoretical end time of the program to be recorded from the theoretical start time and the theoretical duration of the program to be recorded;
   in the first operational mode, the digital television decoder stops the recording of the program to be recorded on the basis of the detection of no identifier of said program in the standardized table;
   in the second operational mode, the digital television decoder stops the recording of the program to be recorded on the basis of the theoretical end time of the program to be recorded.

7. The method for programming according to claim 6, wherein, in the first operational mode, the digital television decoder stops the recording of the program when the digital television decoder detects that the identifier of the program to be recorded disappears from the first data frame.

8. The method for programming according to claim 1, wherein the digital television decoder is initially in the first operational mode.

9. A non-transitory computer readable medium including instructions which, when executed by a computer, implement the steps of the method for programming according to claim 1.

10. A digital television decoder for recording a program, the digital television decoder having a service plan comprising a plurality of services, the program to be recorded being broadcast on a first service from said plurality, the digital television decoder being aware of the first service, an identifier of the program to be recorded and a theoretical start time of the program to be recorded, the digital television decoder comprising hardware elements for implementing the steps of the method for programming according to claim 1.

* * * * *